(12) United States Patent  (10) Patent No.: US 7,556,463 B1
Hall  (45) Date of Patent: Jul. 7, 2009

(54) MOUNTING STRUCTURE

(76) Inventor: Kennith C. Hall, 4912 Macafee Rd., Torrance, CA (US) 90505

( * ) Notice: Subject to any disclaimer, the term of this patent is extended or adjusted under 35 U.S.C. 154(b) by 117 days.

(21) Appl. No.: 11/145,665

(22) Filed: Jun. 6, 2005

(51) Int. Cl.
B60P 7/08 (2006.01)
(52) U.S. Cl. .............................. 410/104; 410/8; 410/106
(58) Field of Classification Search ...................... 410/7, 410/8, 97, 104–106, 110, 116; 24/265 CD, 24/115 K; 248/499
See application file for complete search history.

(56) References Cited

U.S. PATENT DOCUMENTS

| 3,263,629 | A | 8/1966 | Higuchi |
|---|---|---|---|
| 3,353,780 | A | 11/1967 | Young |
| 3,399,635 | A | 9/1968 | Heard |
| 3,422,508 | A | 1/1969 | Higuchi |
| 3,478,995 | A | 11/1969 | Lautzenhiser et al. |
| 4,020,769 | A | 5/1977 | Keir |
| 4,256,424 | A | 3/1981 | Knox et al. |
| 4,273,487 | A | 6/1981 | McLennan |
| 4,969,784 | A | 11/1990 | Yanke |
| 6,238,153 | B1 | 5/2001 | Karrer |
| 6,527,487 | B2 | 3/2003 | Adams |
| 6,592,310 | B2 | 7/2003 | Hyp et al. |
| 6,626,623 | B2 | 9/2003 | DeLay |
| 6,644,901 | B2 | 11/2003 | Breckel |
| 6,739,811 | B1 | 5/2004 | Petelka |
| 6,769,847 | B1 | 8/2004 | Heilmann |
| 6,827,531 | B2 * | 12/2004 | Womack et al. ............. 410/104 |
| 2001/0031185 | A1 | 10/2001 | Swensen |

* cited by examiner

*Primary Examiner*—Stephen Gordon
(74) *Attorney, Agent, or Firm*—Gene Scott, Patent Law & Venture Group

(57) ABSTRACT

A mounting structure for attaching an item in an area defined by an area wall is disclosed including an elongated track including a channel formed therein, the elongated track having at least one elongated channel wall and at least one elongated track flange adapted to be connected to the area wall, and a movable element movable to a selected position within the elongated channel and including at least one element flange for wedging engagement against the at least one elongated channel wall at the selected position.

4 Claims, 5 Drawing Sheets

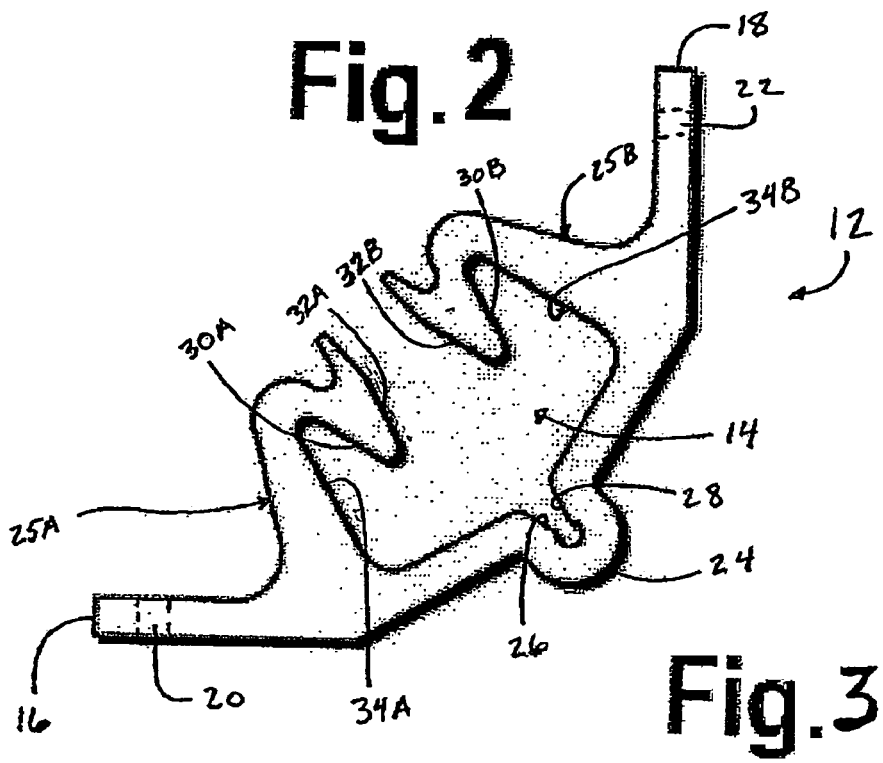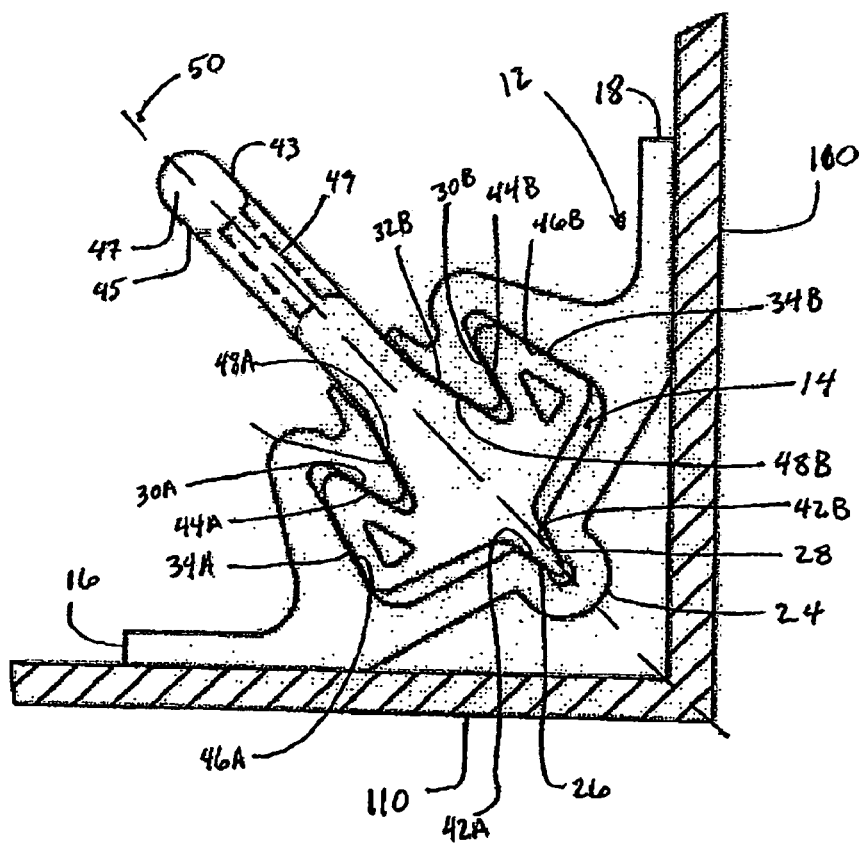

MOUNTING STRUCTURE

TECHNICAL FIELD

The present invention relates generally to a mounting structure to secure an item in a vehicle, room or other area.

BACKGROUND

Mounting structures are attached to the wall or floor of the cargo compartment of a vehicle or a room through which cables and the like are looped to prevent the cargo from shifting. Such mounting structures may have tracks and removable elements. However, the elements and cables are frequently lost or damaged and in many applications there is the need for a captive element which cannot be easily released from the associated track, but which may be readily located in the track It is desirable to be able to place the elements so as to be attached to the track to permit straps, cables, and the like to be connected to the track to hold the cargo in its intended place. Numerous tie-down anchors and associated tracks are known in the prior art. However, many such anchors include more than a single part, having particular shapes and requiring meticulous assembly.

Other mounting structures include elements that consist of a pair of identical parts which are inserted into a track in a back-to-back configuration. Generally, each half of such fasteners includes a foot that extends perpendicular to the portions of the fitting through which the belt is received. Some such elements may made of a single formed plate of metal, but require a looped strap, hinged clip, and insertable pin to hold the plates together so they will not fall out. Such structures require further steps to apply, are susceptible to damage, and may become misplaced if not attached.

Thus, there is a need for a mounting structure which includes improved assembly, locating and securing features.

SUMMARY

There is disclosed herein an improved mounting structure which includes improved assembly, locating and securing features.

It is an object of the invention to provide a mounting structure having an elongated track with a movable element which is of very economical manufacture, yet is dependable in operation.

Another object of the invention is to provide a movable element for an elongated track of a mounting structure wherein the movable element is slidably movable within a channel of the track.

Yet another object of the invention is to provide a movable element for an elongated track of a mounting structure wherein locking of the element to the track is achieved by a wedging engagement resulting from the tension within the cable with which the element is associated.

Still another object of the invention is to provide a movable element for an elongated track of a mounting structure wherein locking of the element to the track may be achieved at any point along the elongated track. The element is engaged to a unique position by a wedging engagement resulting from the tension within the cable with which the element is associated.

An illustrative embodiment of the present invention relates to a mounting structure for attaching an item in an area defined by an area wall including an elongated track including a channel formed therein, the elongated track having at least one elongated channel wall and at least one elongated track flange adapted to be connected to the area wall, and a movable element movable to a selected position within the elongated channel and including at least one element flange for wedging engagement against the at least one elongated channel wall at the selected position.

Another illustrative embodiment of the present invention relates to a method for attaching an item in an area defined by an area wall including providing an elongated track including a channel formed therein, the elongated track having at least one elongated channel wall and at least one elongated track flange adapted to be connected to the area wall, connecting the at least one elongated track flange to the area wall, positioning a movable element in a selected position within the channel, applying a force to the movable element to pull the movable element away from a bottom end of the at least one elongated channel wall, and forming a wedging engagement between at least one element flange of the movable element and an upper end of the at least one elongated channel wall at the selected position.

A more detailed explanation of the invention is provided in the following description and claims and is illustrated in the accompanying drawings.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

FIG. 2 is an end view of the elongated track of one of the mounting structures;

FIG. 3 is a end view of the mounting structure, including the movable element;

DETAILED DESCRIPTION

Figure 1:
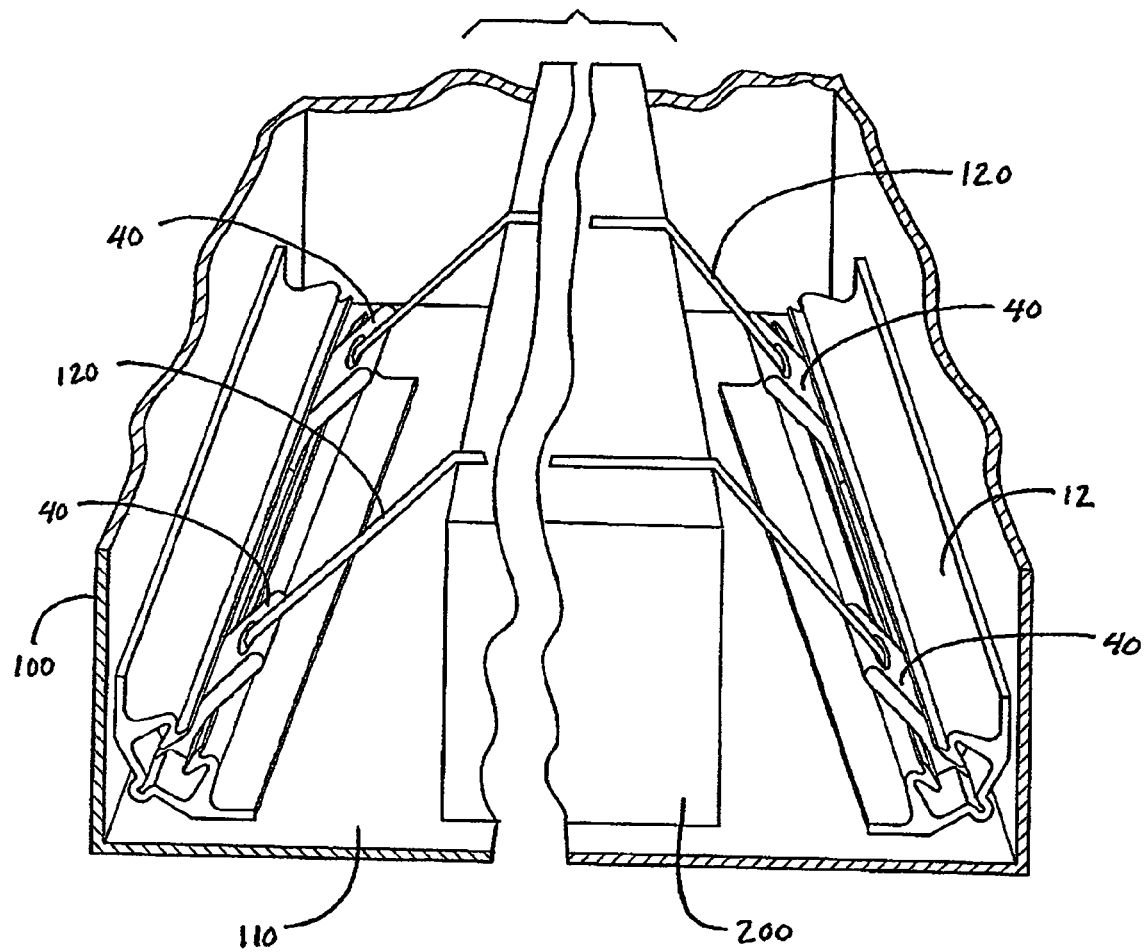
FIG. 1 depicts a truck bed in which two mounting structures incorporating the features of the present invention are used to tie down an item.

Referring to FIG. 1, there is depicted a portion of a vehicle flat bed having walls 100 and a floor 110. An item 200, such as a motorcycle or box, is tied down during transport. To that end a mounting structure 10 incorporating the features of the present invention is attached at the opposing corners of the bed. Each mounting structure includes an elongated track 12 and at least one slidably movable element 40 therein movable to a selected position. A cable 120 bears against or is attached to item 200, and has its ends attached to the element 40 in each mounting structure 10.

Referring now to FIG. 2, the track 12 includes an elongated channel 14 formed therein, which is bounded on either side by elongated channel walls 25A and 25B, and at least one elongated track flange 16, 18. In a preferred embodiment, the track 12 is of unitary construction and extruded from aluminum.

Flanges 16, 18 include holes 20, 22 to accommodate fasteners (not shown) to attach to wall 100 and to floor 110. Flanges 16, 18 are preferably perpendicular to correspond to the wall 100 being perpendicular to the floor 110.

Additionally, track 12 may further include an elongated bead 24 that extends the length of track 12. The bead 24 includes generally opposing diverging channel faces 26 and 28, the purpose of which is explained in detail below. Bead 24 is located along an axis 50 at a 45° angle.

Channel wall 25A includes a pair of converging channel faces 30A and 34A. Channel wall 25B includes a pair of converging channel faces 30B and 34B. Track 12 may further include channel faces 32A and 32B, which converge towards one another.

Figure 4:
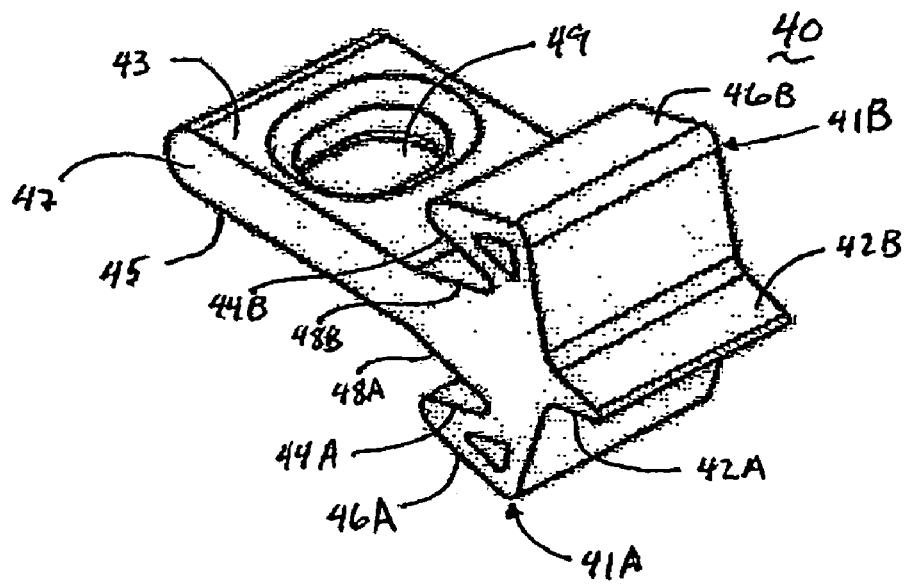
FIG. 4 is a perspective view of the movable element.

Referring to FIGS. 3 and 4, the movable element 40 includes at least one element flange 41A, 41B for wedging engagement in the channel walls 25A and 25B at the selected position. Additionally, the movable element 40 further includes diverging element faces 42A and 42B. Flange 41A includes a pair of converging element faces 44A and 46A. Flange 41B includes a pair of converging element faces 44B and 46B. Element 40 may further include a pair of element faces 48A and 48B formed on tab 47.

Further, in an embodiment, the tab 47 of movable element 40 has a first surface 43 and a second surface 45, with an opening 49 therethrough. The opening 49 may accommodate a cable, such as cable 120 of FIG. 1, to facilitate the securing of cargo. The cable may be, for example, a strap, belt, rope, chain, tether, and the like, as well as associated clips and latching members.

Referring to FIG. 3, in the operation of the illustrated embodiment of a mounting structure 10, the channel 14 formed within the track 12 and bounded by walls 25A and 25B is dimensioned and configured to receive the movable element 40. The element faces 42A and 42B of the element 40 are positioned between the channel faces 26 and 28 as the first and second sets of element faces 44A, 44B, 46A and 46B, of flanges 41A and 41B, respectively, are positioned adjacent to the first and second sets of channel faces 30A, 30B, 34A and 34B. Thus, the first set of element faces 44A and 44B are adjacent to the first set of channel faces 30A and 30B, with the second set of element faces 46A and 46B adjacent to the second set of channel faces 34A and 34B. The third set of element faces 48A and 48B on tab 47 are adjacent to the third set of channel faces 32A and 32B. The movable element 40 is then slidably positioned by the user to a user-defined location along the track 12, which has been secured to the wall 100 and the floor 110 that define a cargo area.

As the cable for attaching the item 200 that is secured or attached to the movable elements 40 through opening 49 are tightened, the element 40 is pulled along the axis 50 that bisects the intersection of the planes of the perpendicular elongated track flanges 16 and 18 and away from the elongated track 12 with element faces 42A and 42B moving away from channel faces 26 and 28, thereby forming a wedging engagement as the first and second sets of element faces 44A, 44B, 46A and 46B contact the first and second sets of channel faces 30A, 30B, 34A and 34B. This wedging engagement is further enhanced as the third set of element faces 48A and 48B contact the third set of channel faces 32A and 32B. Thus, as the cable is tightened to secure a cargo item, it pulls the element 40 into wedging engagement with the track 12 and prevents the movable element 40 from sliding along the track 12 and out of position.

Figure 6:
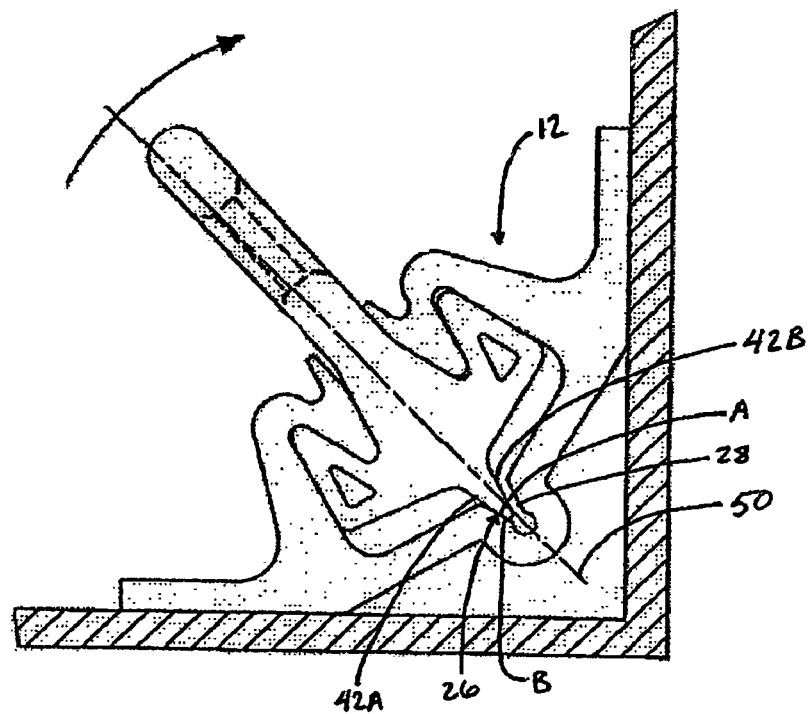
FIG. 6 is a end view of the mounting structure, with the movable element pulled at a positive angle with respect to the axis of the mounting structure.
Figure 7:
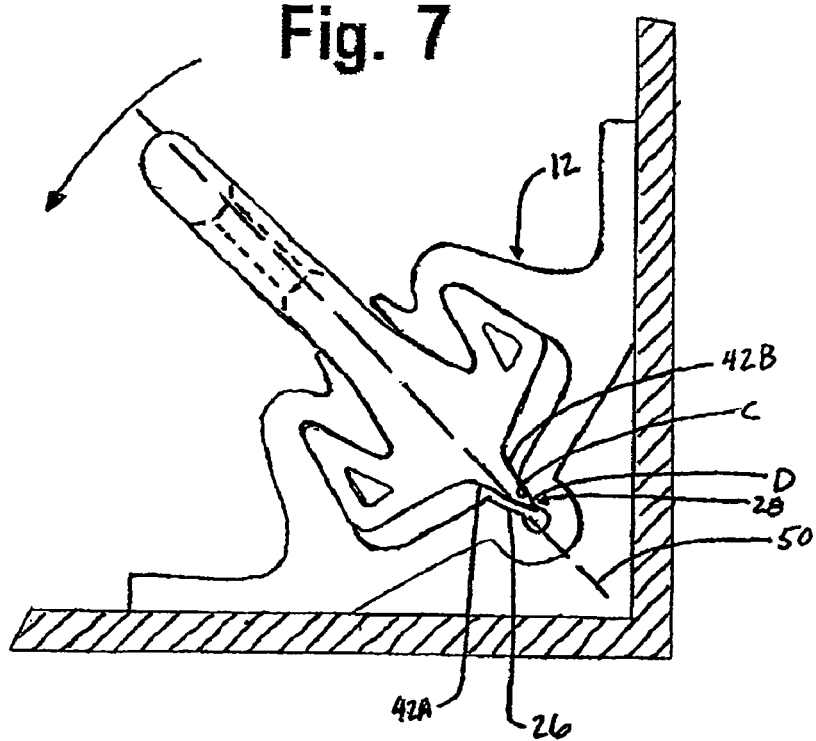
FIG. 7 is a view like FIG. 6 but the movable element being pulled at a negative angle.

In the above explanation it has been assumed that the movable element 40 is pulled along axis 50 of the track 12. However, in many situations, the tightening of the cable will pull the movable element 40 at an angle to the axis 50 of the track 12. Referring now to FIGS. 6 and 7, should the movable element 40 be pulled away from the track 12 at an angle to the axis 50, the wedging engagement is assisted by the contact between the element faces 42A and 42B and opposing channel faces 26 and 28, respectively. As depicted in FIG. 6, as element 40 is pulled away from the track 12 at a positive angle to axis 50, portion A of element face 42A contacts portion B of channel face 28. Referring to FIG. 7, as element 40 is pulled away from the track 12 at a negative angle to axis 50, portion C of element face 42B contacts portion D of channel face 26. The contact between portion A to portion B and portion C to portion D permits the movable element 40 to remain sufficiently aligned with track 12 so that the first and second sets of element faces 44A, 44B, 46A and 46B contact the first and second sets of channel faces 30A, 30B, 34A and 34B.

Figure 8:
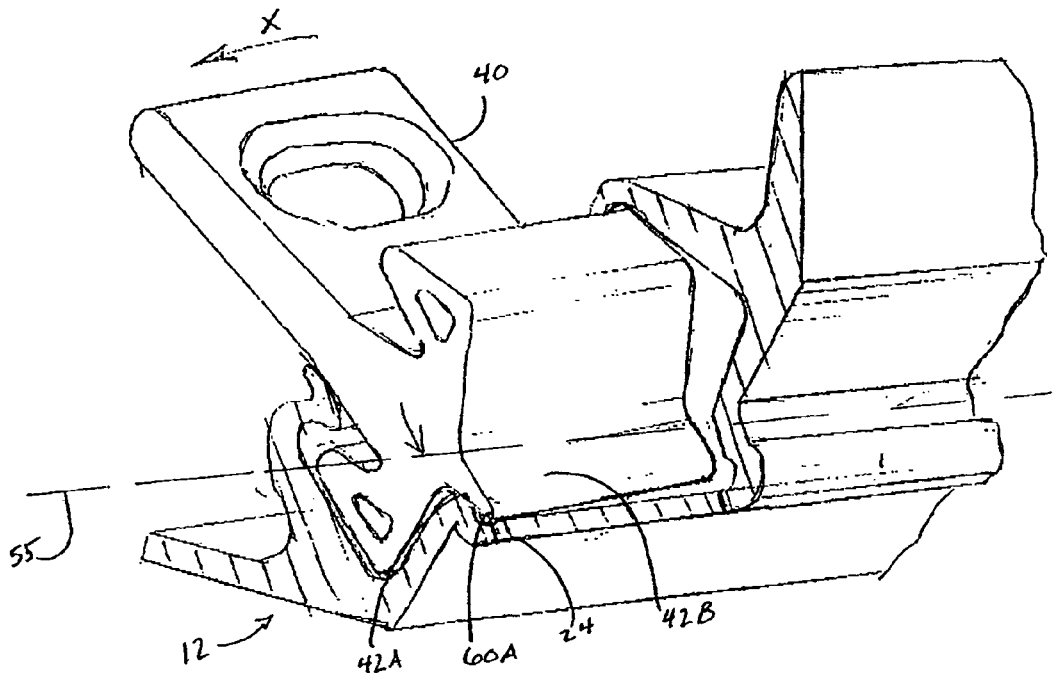
FIG. 8 is partially sectioned view of the mounting structure, with the movable element at a positive angle with respect to the longitudinal axis of the mounting structure.
Figure 9:
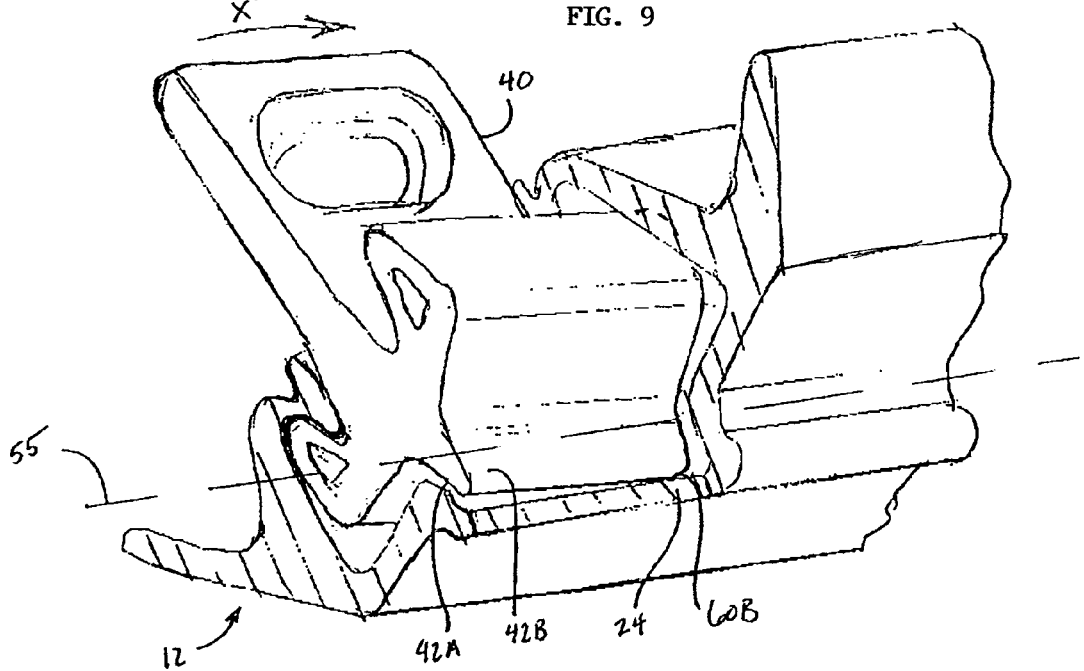
FIG. 9 is a view like FIG. 8 but the movable element being pulled at a negative angle.

Additionally, in other situations, the tightening of the cable will pull the movable element 40 at an angle towards an axis 55 perpendicular to the axis 50 (of FIGS. 6 and 7) of the track 12. Referring now to FIG. 8, should the movable element 40 be pulled at a positive angle X to the axis 55, the wedging engagement is assisted by the contact between the converging point 60A of element faces 42A and 42B and the bead 24. As depicted in FIG. 9, as element 40 is pulled at a negative angle X' to axis 55, converging point 60B of element faces 42A and 42B contacts the bead 24. The contact between converging point 60A and 60B to bead 24, respectively, permits the movable element 40 to remain sufficiently aligned and in wedging engagement with track 12

Figure 5:
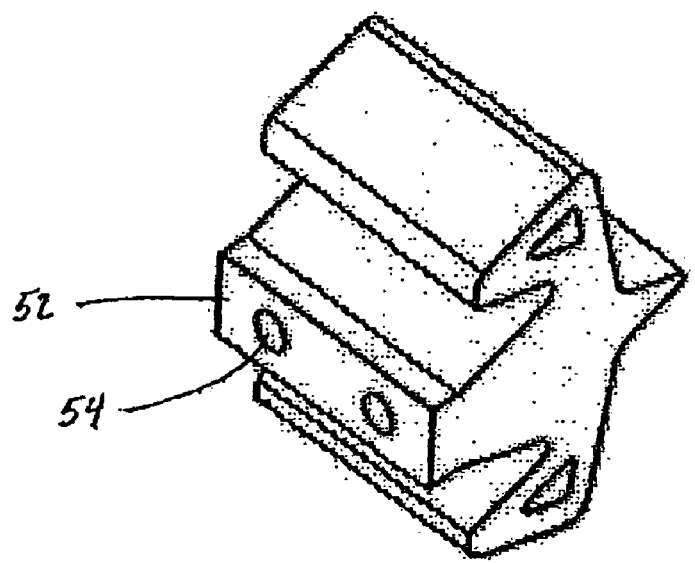
FIG. 5 is a perspective view of an alternative embodiment of the movable element.

Referring to FIG. 5, an alternative embodiment of movable element 40 is illustrated. The tab 47 includes a terminal end 52 having at least one bore 54 to receive a fastener for use in attaching a shelf or structure at the corner. Additionally, the orientation of the terminal end 52 may be at an angle off-center (not shown), so that the at least one bore 54 is similarly angled for receiving a fastener for a substantially planar shelf.

A mounting structure as detailed herein may be utilized in various forms. One such mounting structure may be useful for securing items, for purposes such as preventing movement. Another such mounting structure may incorporate a movable element adapted to receive a shelf, so as support items thereon. From the foregoing, it can be seen that there has been provided an improved mounting structure which greatly facilitates the adjustment thereof to user-determined locations.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A mounting structure for attaching an item in an area defined by an area wall 100, comprising:
    an elongated track 12 including a channel 14 formed therein, the elongated track 12 having a pair of convergent channel walls 25A, 25B; each of the channel walls 25A, 25B having a pair of convergent channel faces 30A, 34A and 30B, 34B, and a pair of diverging track flanges 16, 18 adapted to be connected to the area wall; and a movable element 40 positioned and movable within the channel 14, the movable element 40 having a pair of convergent elongated flanges 41A, 41B, wedgable within the convergent channel faces of the channel walls 25A, 25B, the convergent elongated flanges 41A, 41B contacting the convergent channel faces 30A, 34A and 30B, 34B when the movable element moves away from the area wall 100 along a common axis 50 of symmetry of both the elongated track 12 and the movable element 40.

2. The mounting structure according to claim 1, wherein the convergent channel walls 25A, 25B define a further pair of convergent channel faces 32A, 32B in opposing positions, the further pair of convergent channel faces 32A, 32B in compressive contact with opposing element faces 48A, 48B when the movable element 40 moves away from the area wall 100 along the common axis 50.

3. The mounting structure according to claim 2, wherein the movable element 40 further has a pair of diverging element faces 42A, 42B engaged within a pair of diverging channel faces 26, 28 of the elongated track 12; wherein lateral movements of the movable element 40 are resisted.

4. The mounting structure according to claim 1, wherein the moveable element further includes an opening for receiving a cable attachable to the movable element 40.

* * * * *